United States Patent [19]
Hisano et al.

[11] Patent Number: 6,049,930
[45] Date of Patent: Apr. 18, 2000

[54] WASHING MACHINE AND METHOD OF CONTROLLING THE SAME

[75] Inventors: Koji Hisano; Hiroshi Nishimura; Michiaki Ito, all of Seto, Japan

[73] Assignee: Kabushiki Kaisha Toshiba, Kawasaki, Japan

[21] Appl. No.: 09/118,994

[22] Filed: Jul. 20, 1998

[30] Foreign Application Priority Data

Jul. 18, 1997 [JP] Japan .................................. 9-194148

[51] Int. Cl.⁷ .................................................. D06F 37/40
[52] U.S. Cl. .......................... 8/159; 68/12.02; 68/12.14; 68/23.7
[58] Field of Search ................. 8/159; 68/23.6, 68/23.7, 12.02, 12.14

[56] References Cited

U.S. PATENT DOCUMENTS

| | | | |
|---|---|---|---|
| 5,551,261 | 9/1996 | Lyu et al. | 68/23.6 |
| 5,586,455 | 12/1996 | Imai et al. | 68/23.7 X |
| 5,737,944 | 4/1998 | Nishimura et al. | 68/23.7 |
| 5,778,703 | 7/1998 | Imai et al. | 68/23.7 X |

FOREIGN PATENT DOCUMENTS 6-21594 3/1994 Japan.
7-231639 8/1995 Japan.

*Primary Examiner*—Philip R. Coe
*Attorney, Agent, or Firm*—Pillsbury Madison & Sutro LLP

[57] ABSTRACT

A washing machine includes a rotatable tub in which an agitator is disposed. A tub shaft connected to the rotatable tub is mounted on a base for rotation. A clutch is mounted on the tub shaft to be reciprocally moved so that the clutch engages a clutch engagement hole of the base and an engagement protrusion of a motor rotor alternately. An operation lever mounted on the base is operated so that the clutch is reciprocally moved. The bottom of the base includes a region of rotational locus of the clutch. The region is flat except for the clutch engagement hole so that the clutch is prevented from engaging a portion other than the clutch engagement hole. A reed switch is mounted on the base to be turned on when detecting engagement of the clutch with the clutch engagement hole. A control device proceeds from a dehydration stage to a next stage only when the reed switch is turned on. When the reed switch is not turned on, the rotatable tub is rotated at a low speed with the operation lever being maintained in the operable state, so that an operation for engaging the clutch with the clutch engagement hole is re-executed.

13 Claims, 14 Drawing Sheets

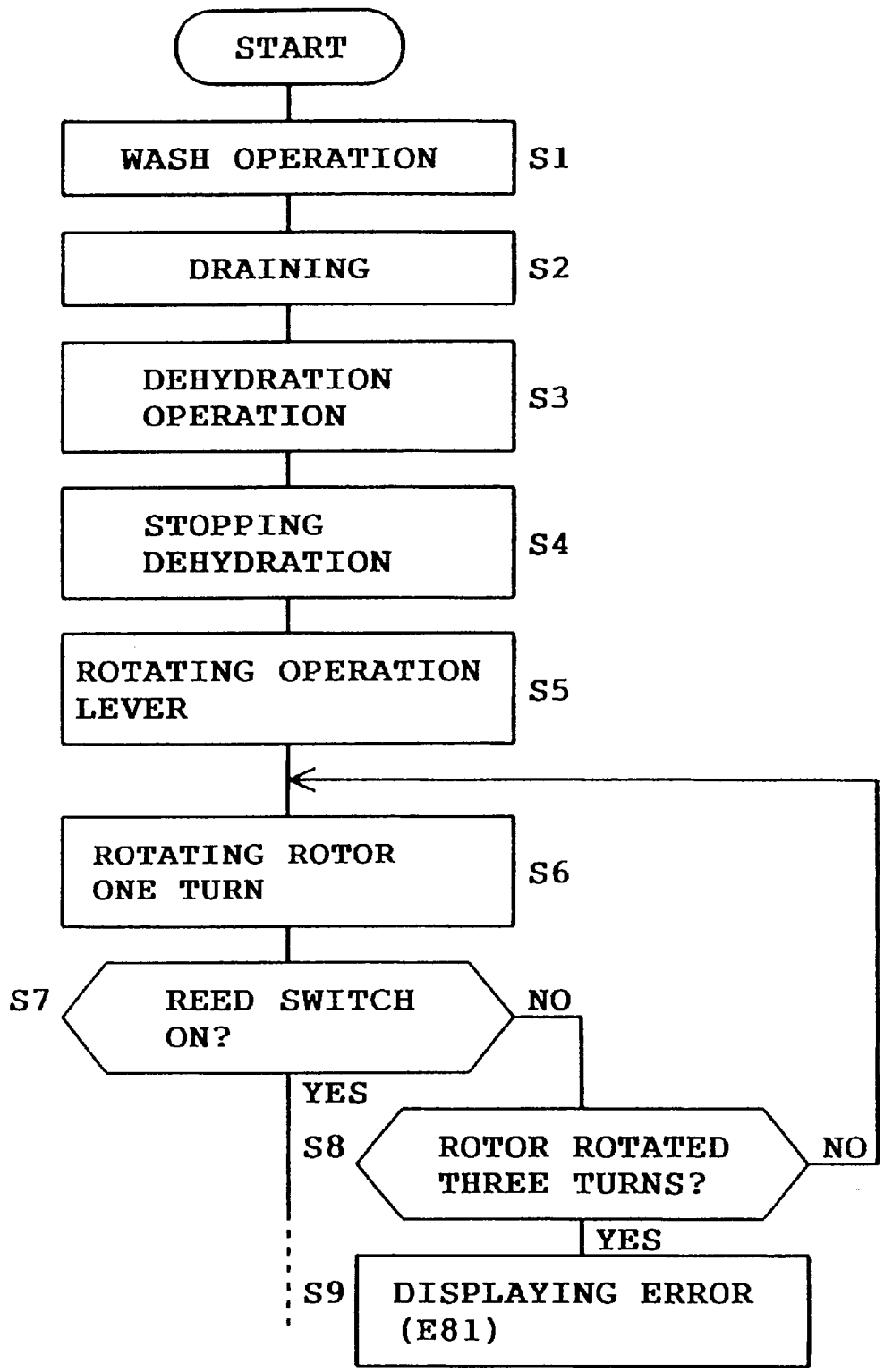
F I G. 16

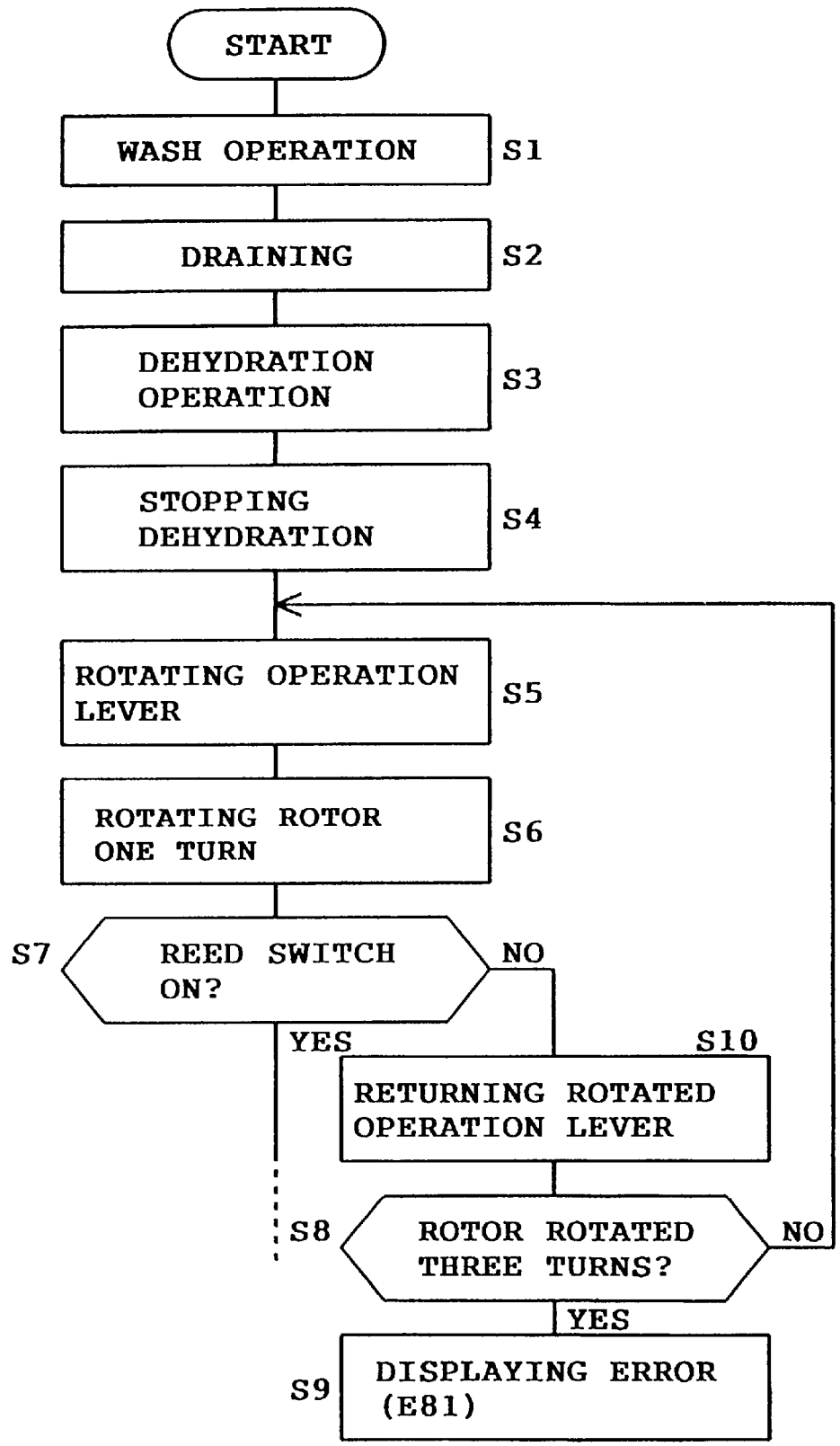
F I G. 1 7

WASHING MACHINE AND METHOD OF CONTROLLING THE SAME

BACKGROUND OF THE INVENTION

1. Field of the Invention

This invention relates generally to a washing machine comprising a rotatable tub accommodating laundry with water at a wash step and rotated at high speeds at a dehydration step for dehydration, an agitator for agitating water in the rotatable tub, and an electric motor for driving the rotatable tub and the agitator, and more particularly to such a washing machine with a switching mechanism connecting the rotatable tub to a rotational system of the motor at the dehydration step and restricting the rotatable tub at the wash step and a rinse step, and a method of controlling the washing machine.

2. Description of the Prior Art

In conventional washing machines of the above-described type, a rotatable tub is connected to a hollow tub shaft rotatably mounted on a base member on which a mechanism section is further mounted. A washing shaft connected to an agitator disposed in the rotatable tub extends through a tub shaft. A drive switching mechanism such as a clutch mechanism is provided for transmitting a rotating force of a single electric motor selectively to the tub shaft or the washing shaft.

In a dehydration step, the tub shaft of the rotatable tub is engaged with a member of a rotation system of the motor by the clutch so that the rotatable tub is rotated at high speeds. In a wash step and a rinse step, the clutch is engaged with a restricting engagement portion provided on a base member stationary relative to the rotatable tub so that the tub shaft is connected via the clutch to the base member, whereby free rotation of the rotatable tub is restricted.

However, the clutch is sometimes engaged with a small rugged portion of the base member other than the restricting engagement portion prior to the start of the wash or rinse step. A sufficient restricting force cannot be obtained for the rotatable tub when the clutch is engaged with an irregular portion as described above. As a result, since the rotatable tub is rotated with water flows caused by the agitator in the wash or rinse step, a laundry agitating effect is reduced. Circularly arranging a number of restricting engagement portions would be suggested as a solution of the above-described problem. However, this solution renders the mechanical structure of the clutch large and complicated.

SUMMARY OF THE INVENTION

Therefore, an object of the present invention is to provide a washing machine with a drive switching mechanism for connecting the rotatable tub to the rotation system of the motor in the dehydration step and for connecting the rotatable tub to the stationary member side in the wash or rinse step to restrict the rotation of the tub, the drive switching mechanism having a simplified structure.

Another object of the invention is to provide a washing machine in which an engaging operation for restriction of the rotatable tub can reliably be achieved so that a reduction in washing and rinsing effects due to free rotation of the rotatable tub can be prevented.

To achieve the objects, the present invention provides a washing machine comprising a rotatable tub provided for rotation, an agitator is provided in the rotatable tub, a motor for driving the agitator, and a drive switching mechanism for selectively forming a first connected state in which the rotatable tub is connected to a stationary member non-rotatable relative to the rotatable tub so that rotation of the rotatable tub is restricted, or a second connected state in which the rotatable tub is connected to a rotation system of the motor to thereby be rotated. The drive switching mechanism comprises a first engagement portion disposed at the stationary member side, a second engagement portion disposed at a side of a member constituting the rotation system of the motor, a movable engagement member movably provided at a side of a member constituting a rotation system of the rotatable tub, and an operation member operated to selectively engage the movable engagement member with the first or second engagement portion. The first connected state is formed when the movable engagement member is engaged with the first engagement portion by the operation member. The second connected state is formed when the movable engagement member is engaged with the second engagement portion by the operation member. The movable engagement member is adapted to be rotated relative to the first engagement portion upon rotation of the rotatable tub to thereby engage the first engagement portion only at a predetermined rotational position thereof.

According to the above-described construction, the movable engagement member is prevented from engaging an abnormal portion at the stationary member side. Consequently, the rotatable tub can reliably be restricted in the wash or rinse step. Thus, since an undesirable free rotation of the rotatable tub is prevented, the wash or rinse step can be prevented from being executed under the condition of an undesirable agitating effect for the laundry.

In a preferred form, the stationary member constitutes a base supporting the rotatable tub, and the first engagement portion is formed on the base and the base includes a region through which the movable engagement member passes, the region further including a part other than the first engagement portion formed substantially into a flat face in a direction of rotation of the movable engagement member. In this construction, the washing machine further comprises a generally flat cover attached so as to cover the part of the region of the base other than the first engagement portion. Consequently, the base is allowed to be formed with a rugged portion for another purpose.

In another preferred form, the member constituting the rotation system of the rotatable tub comprises a tub shaft connected to the rotatable tub and rotatably supported on the base. The movable engagement member comprises a clutch provided at a side of the tub shaft to be rotatable about a fulcrum. The operation member is advanced into and retreated out of a rotational locus of the clutch rotated with the tub shaft. The operation member abuts the clutch at an advanced location to thereby rotate the clutch so that the clutch is engaged alternately selectively with the first and second engagement portions.

In further another preferred form, the washing machine further comprises an engagement detector for detecting accomplishment or non-accomplishment of engagement between the first engagement portion and the movable engagement member, for example, a detecting switch. In this construction, when the engagement between the first engagement portion and the movable engagement member is incomplete, an abnormal condition eliminating operation such as re-execution of engagement between them can readily be carried out by an electric control device on the basis of detection of the incomplete engagement.

In the above-described construction, an ON or OFF state of the switch is preferably reversed prior to engagement of the clutch with the second engagement portion when the clutch is moved from the first engagement portion to the second engagement portion. Consequently, the ON or OFF state of the switch of the engagement detecting means can readily prevent the washing operation from proceeding to the dehydration stage in an abnormal condition that the clutch is in half-engagement with both the first and second engagement portions.

In further another preferred form, the operation member pushes the clutch to thereby rotate the same in a direction of engagement with the second engagement portion in a course of movement of the operation member into the rotational locus of the clutch when the movable engagement member is in engagement with the first engagement portion. Furthermore, the clutch collides against the operation member to be rotated in a direction of engagement with the first engagement portion upon rotation of the rotatable tub when the operation member is in the rotational locus of the clutch with the movable engagement member being in engagement with the second engagement portion. In this construction, two mechanical displacements, that is, the movement of the operation member and the rotation of the rotatable tub, are readily obtained. Since the clutch is rotated between the first and second engagement portions alternately by the two mechanical displacements, the construction therefor can be simplified.

The invention also provides a method of controlling the washing machine constructed as described above, the method comprising the step of switching a step of a washing operation to another step on a condition that the engagement detecting means has detected the engagement of the movable engagement member with the first engagement portion.

According to the above-described control method, a next step of the washing operation such as the rinse step is executed only when the movable engagement member engages the first engagement portion. Consequently, the rinse step can be prevented from being executed under the condition of an undesirable agitating effect for the laundry.

A preferred form of the control method comprises the steps of rotating the rotatable tub at a speed lower than in a dehydration operation at a predetermined number of times, determining, on the basis of the signal delivered from the engagement detector, whether the movable engagement member has engaged the first engagement portion during rotation of the rotatable tub at the lower speed, re-executing rotation of the rotatable tub at the lower speed when the movable engagement member has been determined not to have engaged the first engagement portion, and re-determining whether the movable engagement member has engaged the first engagement portion during re-rotation of the rotatable tub at the lower speed, and switching a step of a washing operation to another step when engagement of the movable engagement member with the first engagement portion has been determined to have been accomplished at the re-determining step.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 16 is a flowchart showing the control contents of the control device;

FIG. 17 is a view similar to FIG. 16, showing the control contents of the washing machine of a second embodiment;

DETAILED DESCRIPTION OF THE PREFERRED EMBODIMENTS

Figure 1:
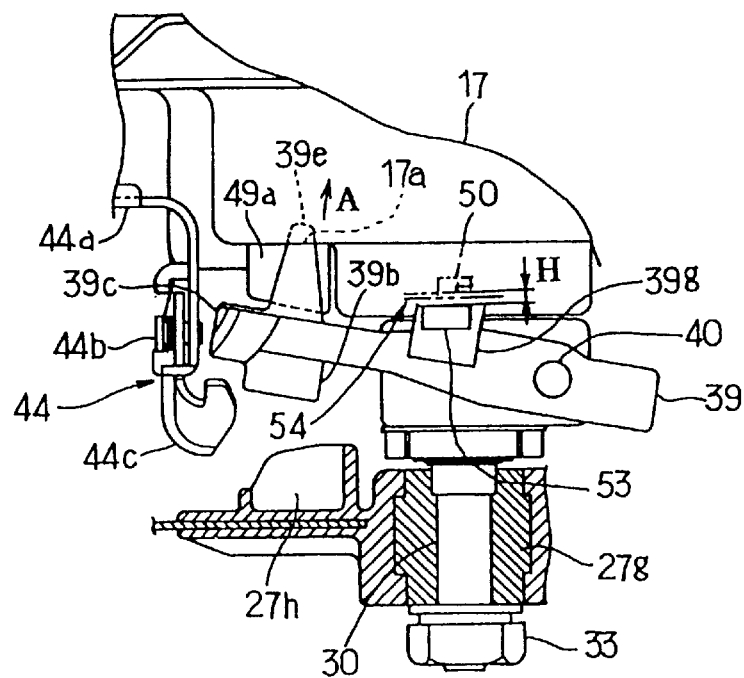
FIG. 1 is a partially broken side view of the drive switching mechanism for the rotatable tub of a washing machine of a first embodiment in accordance with the present invention in the wash or rinse step.

The washing machine of a first embodiment in accordance with the present invention will be described with reference to FIGS. 1 to 16. Referring first to FIG. 13, the overall washing machine is shown. An outer cabinet 11 encloses a water-receiving tub 13 elastically suspended on a plurality of elastic suspension mechanisms 12 one of which is shown in FIG. 13. The bottom of the water-receiving tub 13 is formed with a drain hole 13a to which a drain valve 14 is attached.

Figure 3:
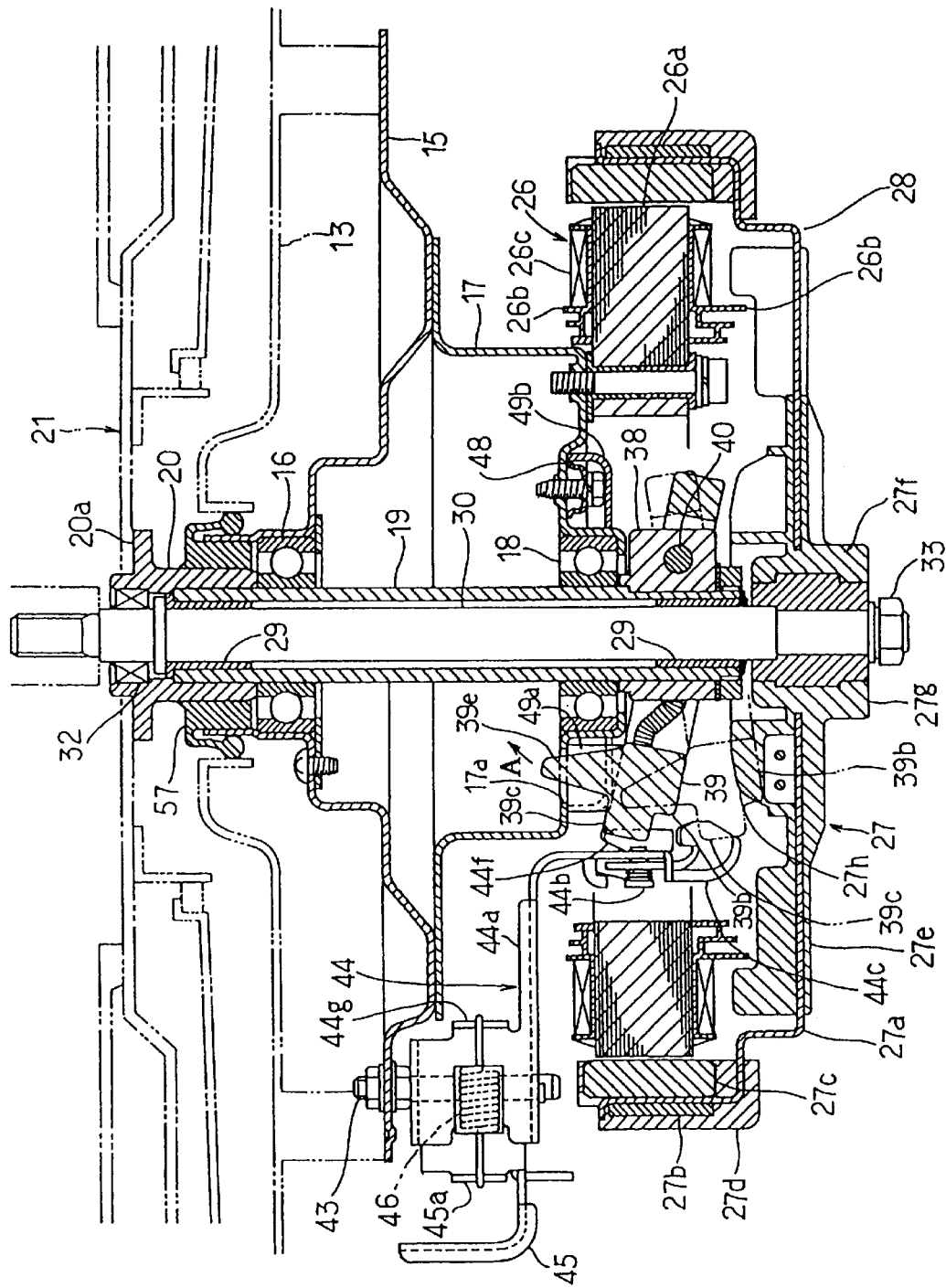
FIG. 3 is a longitudinal section of the driving mechanism of the washing machine.

Referring to FIG. 3, an upper cup 15 made of a metal is screwed to the bottom of the water-receiving tub 13. An outer ring of a rolling bearing 16 is fixed to a central portion of the upper cup 15. A lower cup 17 made of a metal is welded to the upper cup 15. The lower cup 17 serves as a base or a stationary member non-rotatable relative to a rotatable tub 21 as will be described later. An outer ring of a rolling bearing 18 is fixed to a central portion of the lower cup 17. A cylindrical tub shaft 19 is fixed to inner rings of the rolling bearings 16 and 18.

A cylindrical attachment 20 is fixed to an upper end of the tub shaft 19. The attachment 20 has an annular flange 20a formed integrally therewith. The rotatable tub 21 is screwed to the flange 20a. The rotatable tub 21 is disposed in the water-receiving tub 13 to accommodate laundry together with water. The rotatable tub 21 includes a tapered outer cylinder 21a whose diameter is upwardly increased, an inner cylinder 21b fixed to the outer cylinder 21a, and a balancing ring 21c fixed to an upper end of the outer cylinder 21a. The outer and inner cylinders 21a and 21b have through holes 21d and 21e through which the cylinders communicate with the drain hole 13a, respectively. Reference numeral 23 designates a cover defining a water flow passage 22 in cooperation with the water-receiving tub 13.

Figure 13:
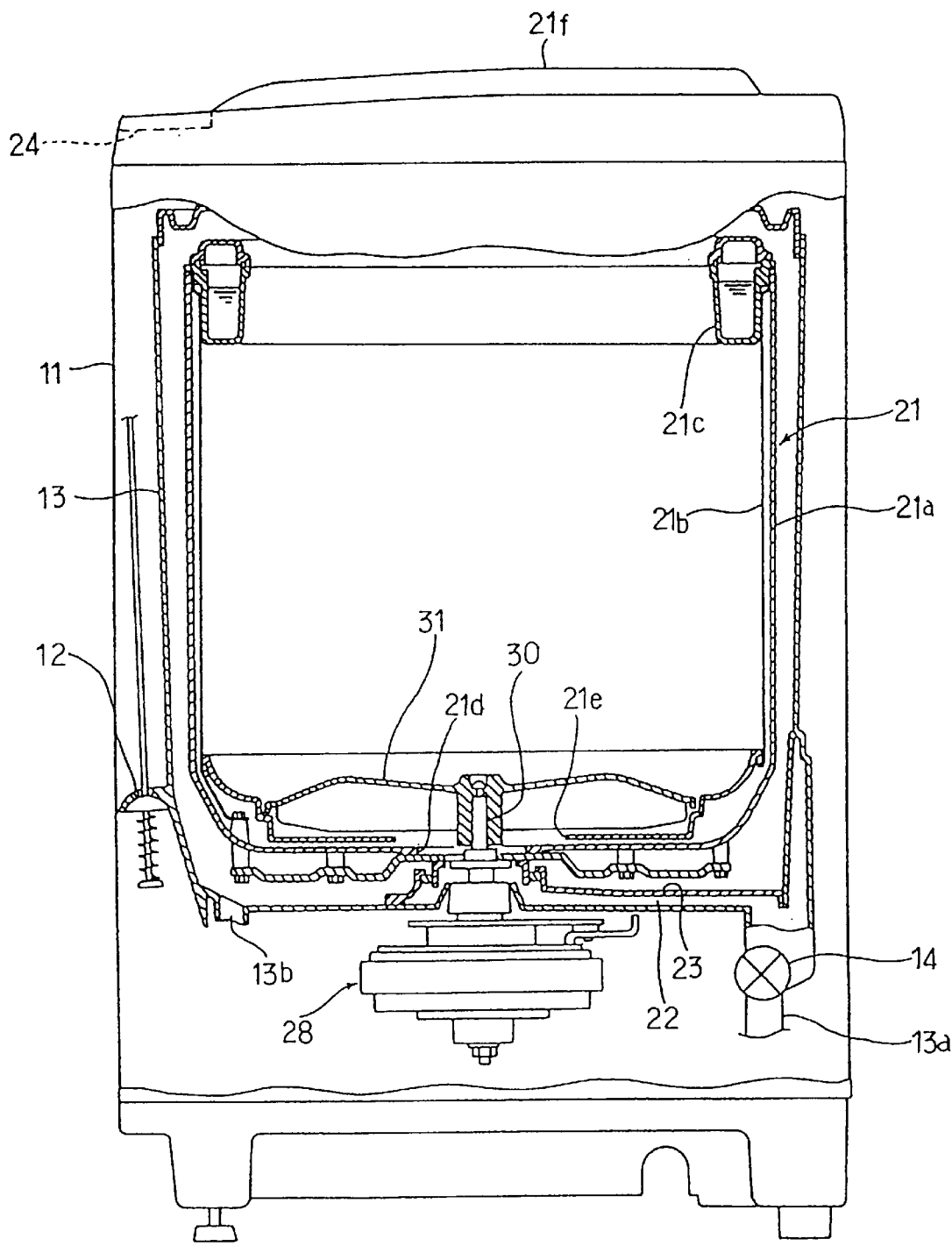
FIG. 13 is a longitudinal section of the overall washing machine.
Figure 14:
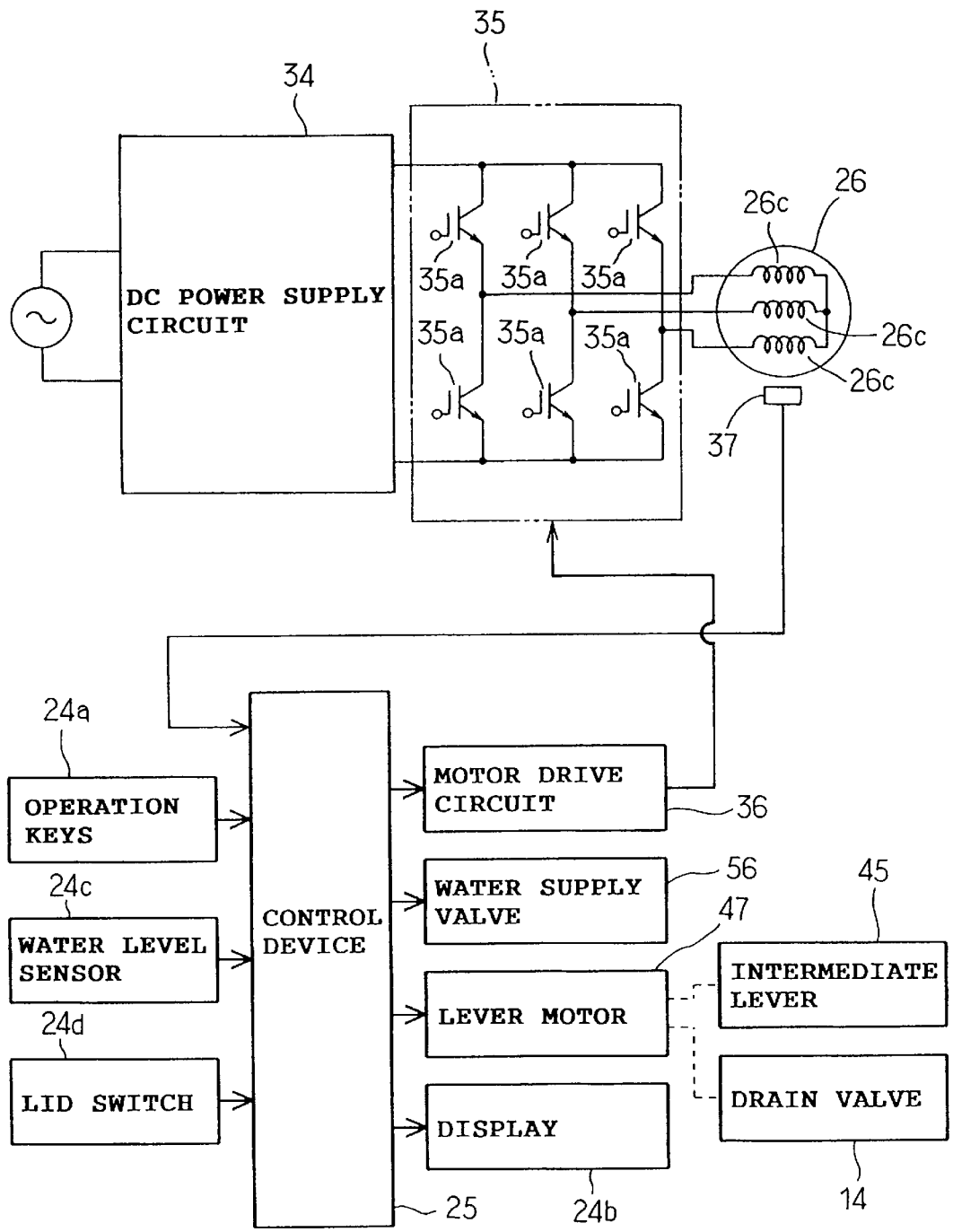
FIG. 14 is a block diagram showing the electrical arrangement of the washing machine.

Referring to FIG. 14, an operation panel 24 is provided on a front end of the top of the outer cabinet 11. The operation panel 24 includes a plurality of operation keys 24a and a display 24b. A control circuit board (not shown) is incorporated in the operation panel 24. A control device 25 mainly composed of a microcomputer is mounted on the control circuit board. A water level sensor 24c is provided for detecting a level of water in the rotatable tub 21. A lid 21f is provided for closing and opening a top opening of the outer cabinet 11 as shown in FIG. 13. A lid switch 24d in FIG. 14 is provided for detecting the opening and closure of the lid 21f.

Figure 11:
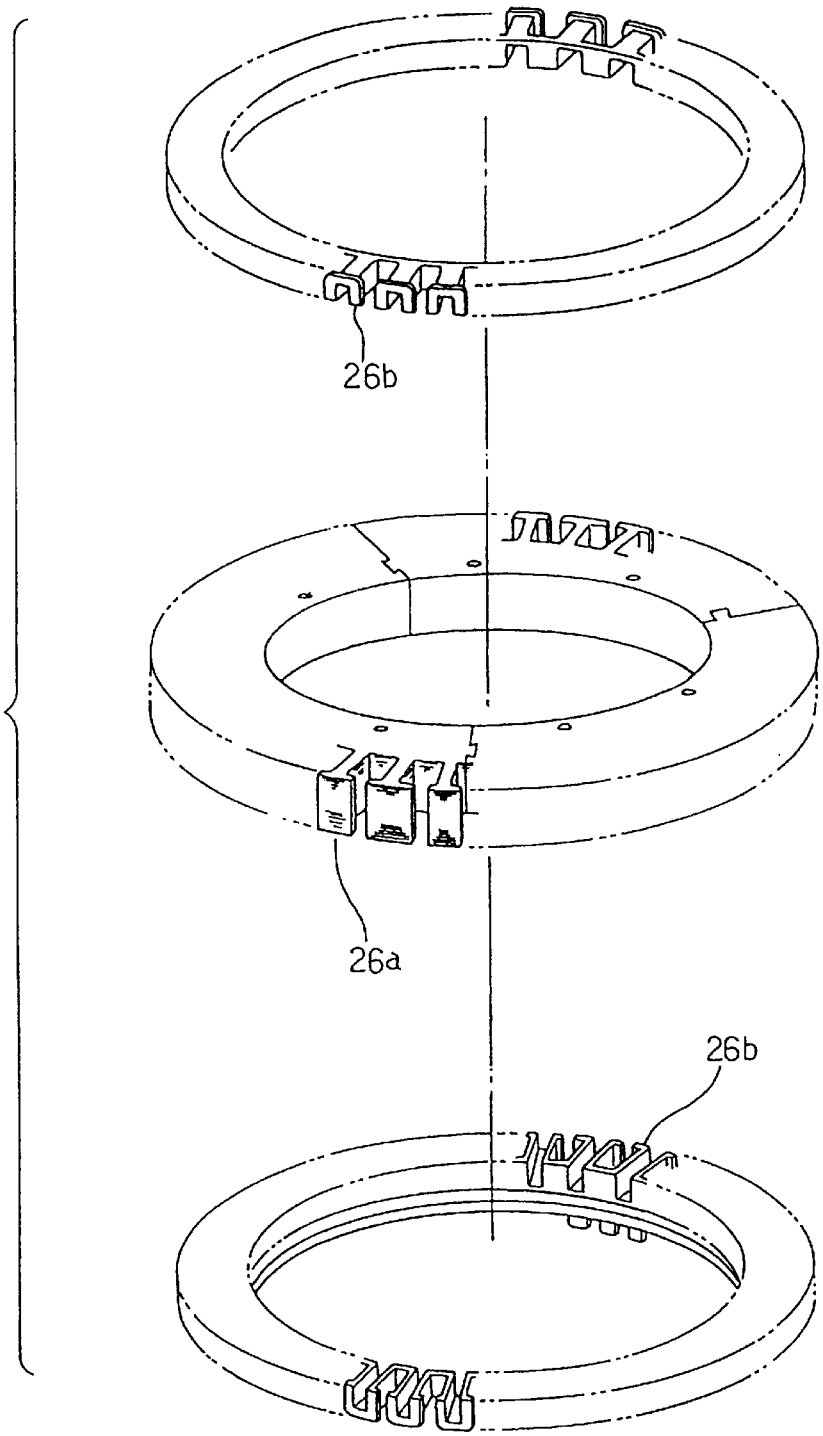
FIG. 11 is an exploded perspective view of the stator of the motor.

A stator 26 of a three-phase brushless DC motor 28 of the outer rotor type is screwed to the lower cup 17 as shown in FIG. 3. The stator 26 includes a 36-pole stator core 26a, two insulating covers 26b, and thirty-six coils 26c (see FIG. 3) as shown in FIG. 11. The insulating covers 26b axially cover the stator core 26a. Each coil 26c is wound on a corresponding tooth of the stator core 26a with the insulating covers 26b being interposed therebetween as shown in FIG. 3.

A rotor 27 of the motor 28 includes a circular dish-shaped housing 27a made of a steel plate, an annular yoke 27b disposed along the outer circumference of the housing 27a, twenty-four permanent magnets 27c arranged along the inner circumference of the housing 27a. The housing 27a, the yoke 27b and the permanent magnets 27c are integrated by a generally annular connecting portion 27d made of a resin. The housing 27a has a circular disk 27e formed integrally on a central portion thereof. A cylindrical portion 27f is integrally formed on a central portion of the disk 27e. A metal pipe 27g is embedded in the cylindrical portion 27f.

The connecting portion 27d, the circular disk 27e, and the cylindrical portion 27f are formed by pouring molten resin into a cavity of a forming die (not shown) with the housing 27a, the yoke 27b, the permanent magnets 27c and the metal pipe 27g being accommodated in the cavity. Thus the three-phase brushless DC motor 28 of the outer rotor type is composed of the stator 26 and the rotor 27.

Two metal bearings 29 are attached to the upper and lower ends of the inner circumference of the tub shaft 19. A hollow agitator shaft 30 is fitted with the inner circumferential faces of the bearings 29. An agitator 31 is screwed to the upper end of the agitator shaft 30 extending into the interior of the rotatable tub 21 as shown in FIG. 13. An outer ring of a rolling bearing 32 is fixed to the attachment 20 as shown in FIG. 3. The agitator shaft 30 is fixed to an inner ring of the rolling bearing 32. A metal sleeve 27h is embedded in the outer circumference of the agitator shaft 30 so as to be located at the lower end of the latter. The rotor 27 is fixed to the agitator shaft 30 by screwing a screw 33 into the lower end of the agitator shaft 30 so that the metal sleeve 27h is fastened between the screw 33 and the agitator shaft 30.

A drive circuit board (not shown) is incorporated in the operation panel 24 so as to be located below the control circuit board. A DC power supply circuit 34 is mounted on the drive circuit board as shown in FIG. 14. The DC power supply circuit 34 is mainly composed of a voltage doubler rectifier circuit and a smoothing capacitor. An inverter main circuit 35 is further mounted on the drive circuit board so as to be located at the output side of the DC power supply circuit 34. The inverter main circuit 35 is connected to phase coils 26c of the stator 26.

The control device 25 is connected via a motor drive circuit 36 to the inverter main circuit 35. The inverter main circuit 35 is PWM-controlled so that a driving power is supplied to the phase coils 26c. Consequently, the agitator shaft 30 and accordingly, the agitator 31 are rotated with the rotor 27 at a target speed. The inverter main circuit 35 includes six switching elements 35a, for example, IGBTs, connected into a three-phase bridge configuration. Two Hall elements 37 are fixed to the stator core 26a. Based on output signals of the Hall element 37, the control device 25 carries out an operation to obtain a rotational direction and a rotational position of the rotor 27.

Figures 4, 5:
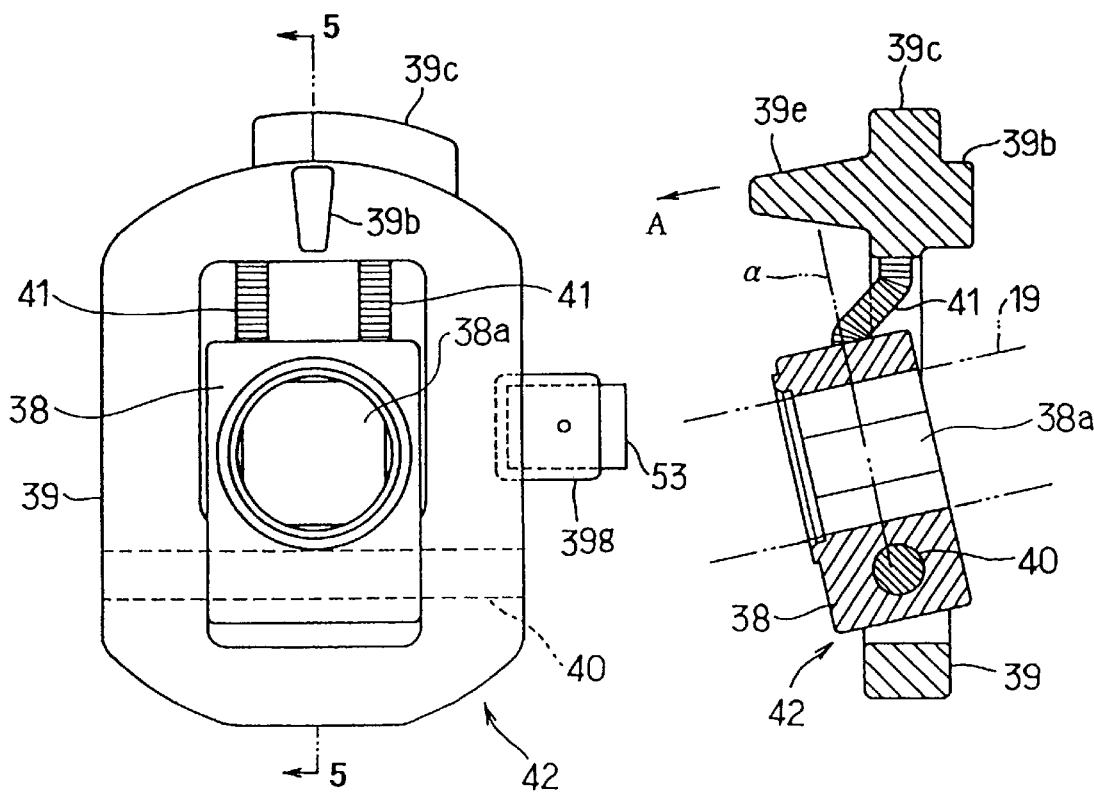
FIG. 4 is a bottom view of the clutch mechanism.
FIG. 5 is a sectional view taken along line 5—5 in FIG. 4.

Drive switching means for the rotatable tub will now be described. An aluminum die-cast clutch holder 38 is fixed to the outer circumference of the tub shaft 19 so as to be located between the lower cup 17 and the rotor 27. The clutch holder 38 is formed generally into a rectangular shape as shown in FIGS. 4 and 5. A clutch 39 is disposed on an outer circumference of the clutch holder 38. The clutch 39 is formed generally into a rectangular shape and serves as a movable engagement member in the invention. The clutch 39 is die-cast from aluminum. A metal shaft 40 extends through the clutch holder 38 and the clutch 39. The clutch 39 is rotatable about the shaft 40 as a fulcrum relative to the clutch holder 38. The clutch holder 38 has a generally square through hole 38a through which the tub shaft 19 extends so that the tub shaft is rotated with the clutch holder.

Figures 6, 7:
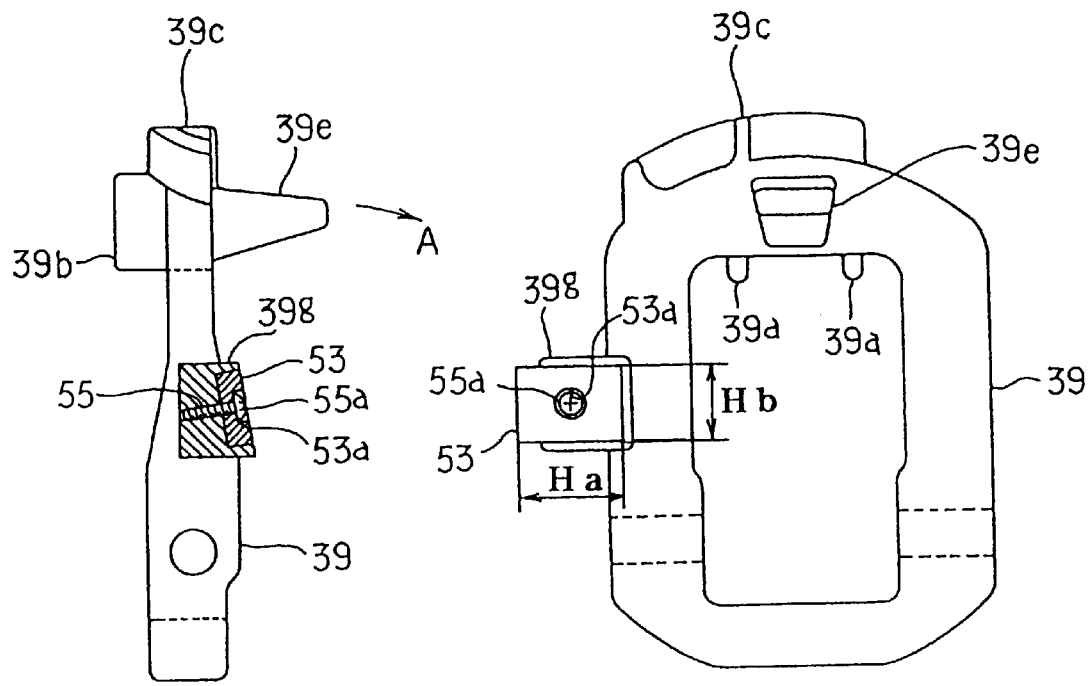
FIG. 6 is a plan view of the clutch of the drive switching mechanism.
FIG. 7 is a partially broken side view of the clutch.

The clutch 39 has two protrusions 39a formed integrally on the inner peripheral face thereof as shown in FIG. 6. The protrusions 39a are fitted in one ends of two toggle springs 41 respectively as shown in FIG. 4. The other ends of the toggle springs 41 are fitted in recesses (not shown) formed in the clutch holder 38. Each toggle spring 41 comprises a compression coil spring. The toggle springs 41 urge the clutch 39 in a direction of arrow A when the protrusions 39a are located in the left of a neutral line a as viewed in FIG. 5. The toggle springs 41 urge the clutch 39 in a direction opposite the arrow A when the protrusions 39a are located in the right of the neutral line a as viewed in FIG. 5. Reference numeral 42 designates a toggle clutch mechanism comprising the clutch holder 38, the clutch 39, the shaft 40, and the toggle springs 41.

Figure 12:
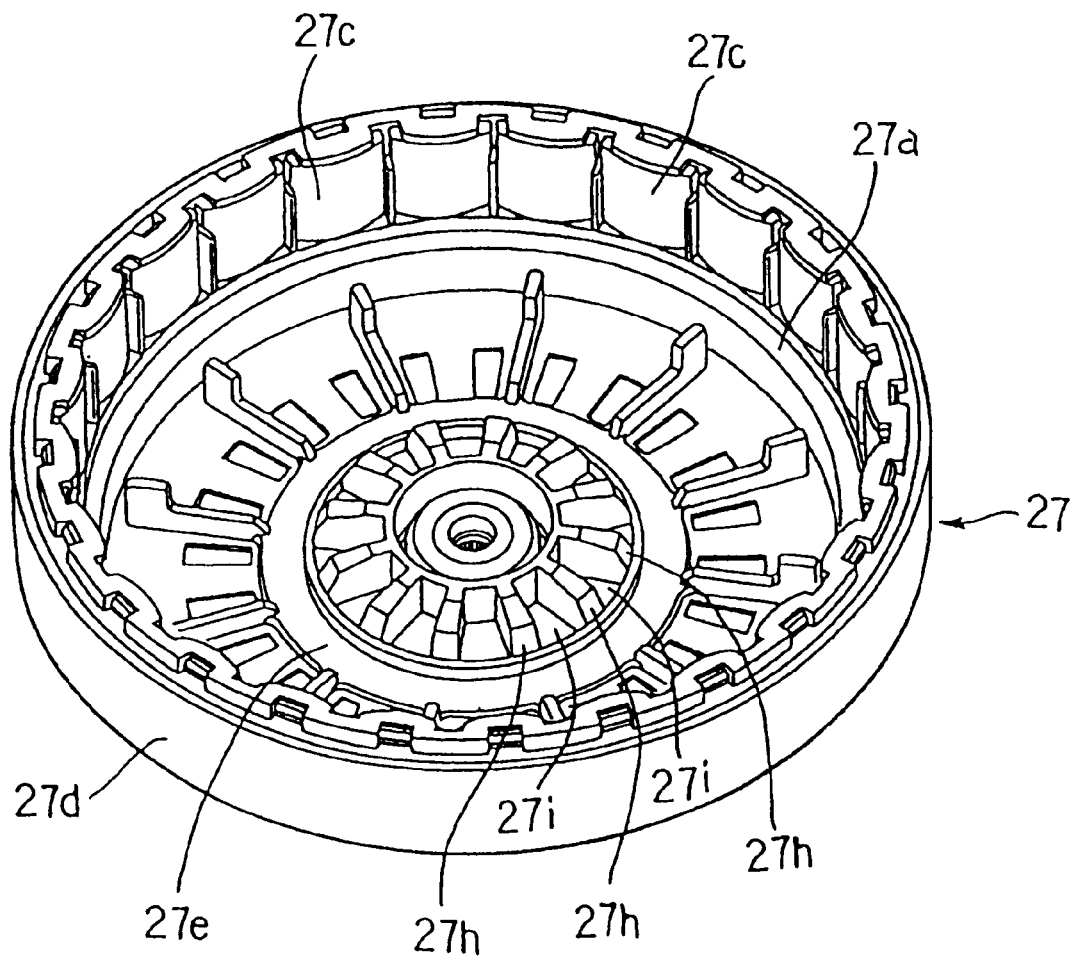
FIG. 12 is a perspective view of the rotor of the motor.

The circular disk 27e of the rotor 27 has a plurality of radially extending engagement protrusions 27h formed integrally thereon as shown in FIG. 12. The engagement protrusions 27h serve as second engagement portions in the invention. Each engagement protrusion 27h and the adjacent one define an engagement recess 27i therebetween. The clutch 39 has a connecting protrusion 39b formed integrally thereon so as to protrude downward or in the direction opposite arrow A as shown in FIGS. 4 and 5. The protrusion 39b is held between the engagement protrusions 27h or in the engagement recess 27i when the clutch 39 is rotated in the direction of arrow A as shown in two-dot chain line in FIG. 3. Upon rotation of the rotor 27 in this state, a rotating force thereof is transmitted via the connecting protrusion 39b, the clutch 39 and the clutch holder 38 to the tub shaft 19, so that the rotatable tub 21 is rotated with the clutch holder 38, the clutch 39 and the tub shaft 19. With this, the rotating force of the rotor 27 is transmitted via the agitator shaft 30 to the agitator 31 so that the agitator 31 is rotated with the rotatable tub 21. The rotatable tub 21 is rotated in a dehydration step in the manner as described above.

A screw 43 is fixed to the upper cup 15. Operation means or an operation lever 44 is rotatably mounted on the screw 43. The operation lever 44 includes a generally L-shaped lever body 44a, an operation plate 44c rotatably mounted on the body 44a by a pin 44b, and a torsion coil spring 44d attached to the pin 44b. The torsion coil spring 44d has both arms pressed against the lever body 44a and the operation plate 44c respectively.

Figure 8:
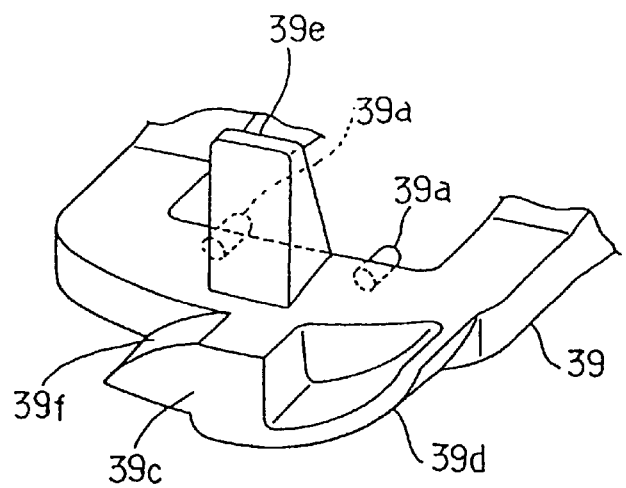
FIG. 8 is a partial perspective view of the clutch.
Figure 15:
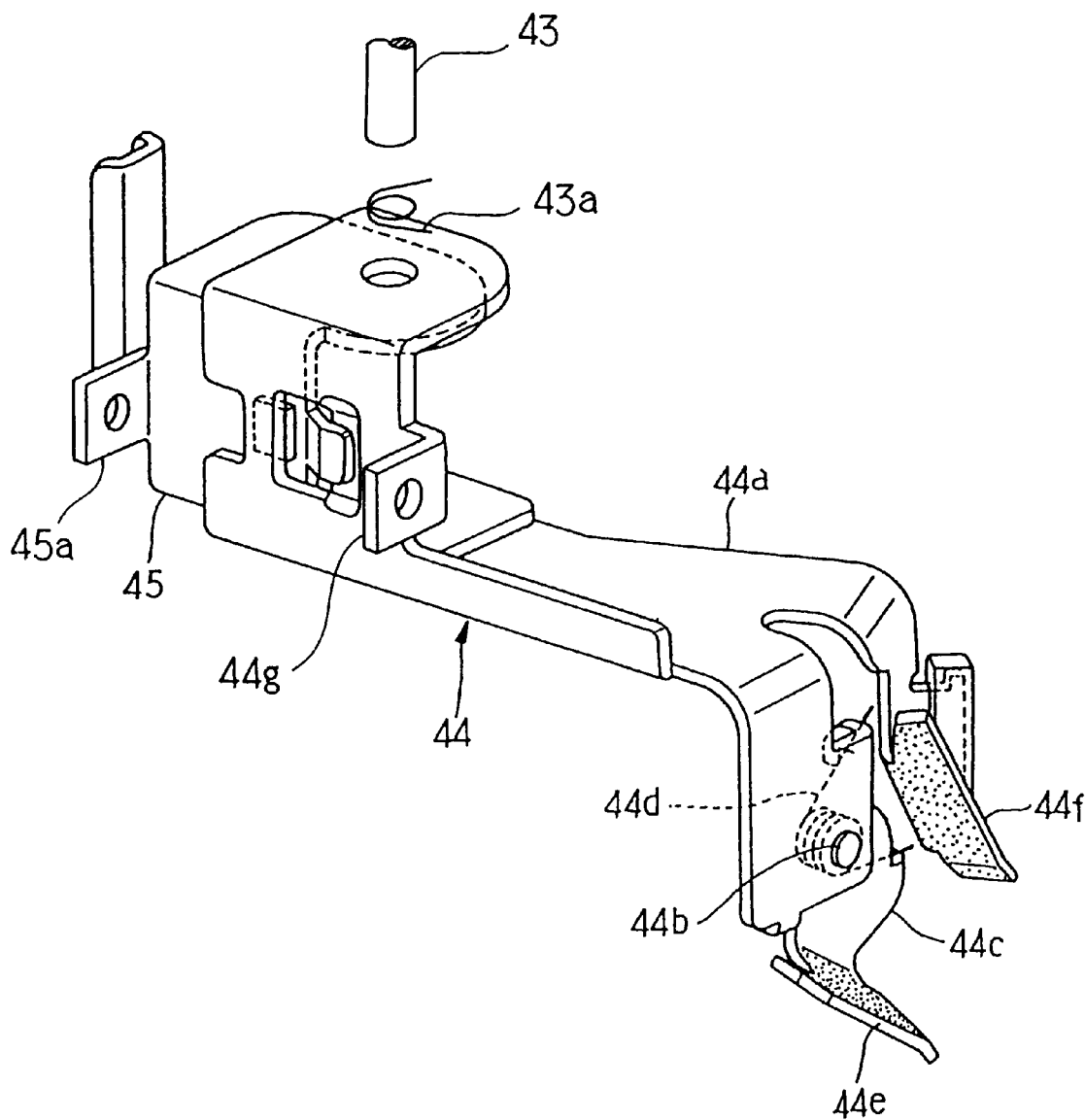
FIG. 15 is a perspective view of the operation lever and intermediate lever of the drive switching mechanism.

An intermediate lever 45 is rotatably mounted on the screw 43 as shown in FIGS. 3 and 15. A connecting spring 46 comprising a tension spring 46 is provided between a tongue 45a of the intermediate lever 45 and a tongue 44g of the body 44a of the operation lever 44. The clutch 39 has a protrusion 39c formed integrally on the distal end thereof as shown in FIGS. 6 and 8. A torsion coil spring 43a is attached to the screw 43 as shown in FIG. 15. The torsion coil spring 43a urges the operation lever 44 together with the intermediate lever 45 so that the operation plate 44c of the operation lever 44 is withdrawn outside a rotational locus of the protrusion 39c of the clutch 39.

A lever motor 47 (see FIG. 14) is connected to the intermediate lever 45. The control device 25 drives the lever motor 47 to thereby rotate the intermediate lever 45 about the screw 43 so that this rotational displacement is transmitted as a rotating force via the connecting spring 46 to the operation lever 44. Consequently, the operation lever 44 is rotated about the screw 43 together with the intermediate lever 45, whereupon the operation plate 44c of the operation lever 44 advances into the rotational locus of the protrusion 39c of the clutch 39. The lever motor 47 is also connected to the drain valve 14 so that the drain valve 14 is closed or opened upon drive of the lever motor 47.

The protrusion 39c of the clutch 39 has an inclined face 39d or backside as shown in FIG. 8. The operation plate 44c has an inclined portion 44e as shown in FIG. 15. As shown by two-dot chain line in FIG. 3, when the connecting protrusion 39b of the clutch 39 is in engagement with the engagement protrusions 27h of the rotor 27, the inclined portion 44e of the operation plate 44c advances into the rotational locus of the protrusion 39c of the clutch 39 so that the clutch 39 is rotated at a low speed together with the rotor 27. Consequently, the inclined face 39d of the clutch 39 abuts the inclined portion 44e of the operation plate 44c. Then, the inclined face 39d is raised along the inclined portion 44e such that the clutch 39 is rotated about the shaft 40 in the direction of arrow A.

The clutch 39 has a restricting claw 39e formed integrally thereon to be located right above the connecting protrusion 39b as shown in FIGS. 6 to 8. The lower cup 17 is formed with a clutch engagement hole 17a serving as a first engagement portion in the invention. When the clutch 39 is rotated in the direction of arrow A so that the restricting claw 39e engages the clutch engagement hole 17a, the connecting protrusion 39b of the clutch 39 is released from the engagement with the engagement protrusions 27h of the rotor 27. As a result, since the tub shaft 19 is substantially connected via the clutch 39 and the clutch holder 38 to the lower cup 17 to thereby be restricted, the rotating force of the rotor 27 is transmitted via the agitator shaft 30 only to the agitator 31.

The lever body 44a of the operation lever 44 has an inclined portion 44f formed by bending a part thereof as shown in FIG. 15. The protrusion 39c of the clutch 39 has an upper inclined face 39f as shown in FIG. 8. As shown by solid line in FIG. 3, when the operation lever 44 is rotated while the restricting claw 39e of the clutch 39 is in engagement with the clutch engagement hole 17a of the lower cup 17, the inclined portion 44f abuts the inclined face 39f of the clutch 39 to push the latter downward along the inclined portion 44f. Then, the clutch 39 is rotated in the direction opposite arrow A so that the connecting protrusion 39b thereof engages the engagement protrusions 27h of the rotor 27, whereupon the restricting claw 39e of the clutch 39 is released from the engagement with the clutch engagement hole 17a of the lower cup 17.

Figure 9:
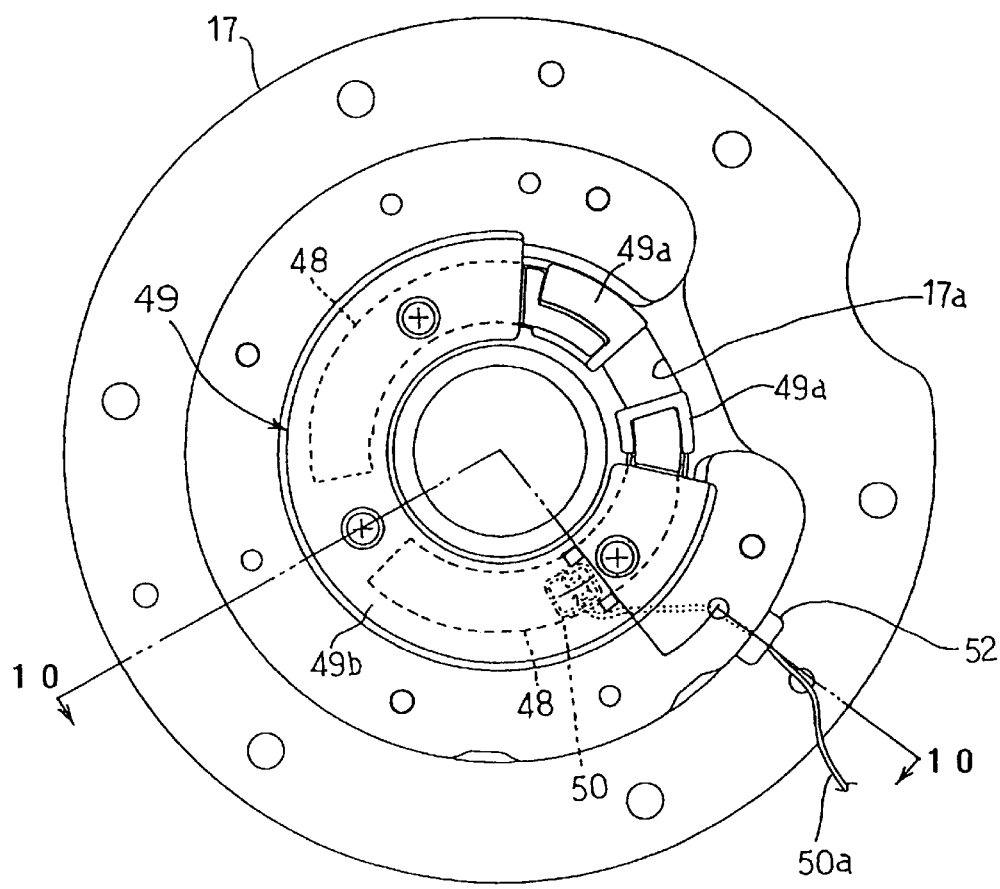
FIG. 9 is a bottom view of the lower cup of a base supporting the mechanism section.
Figure 10:
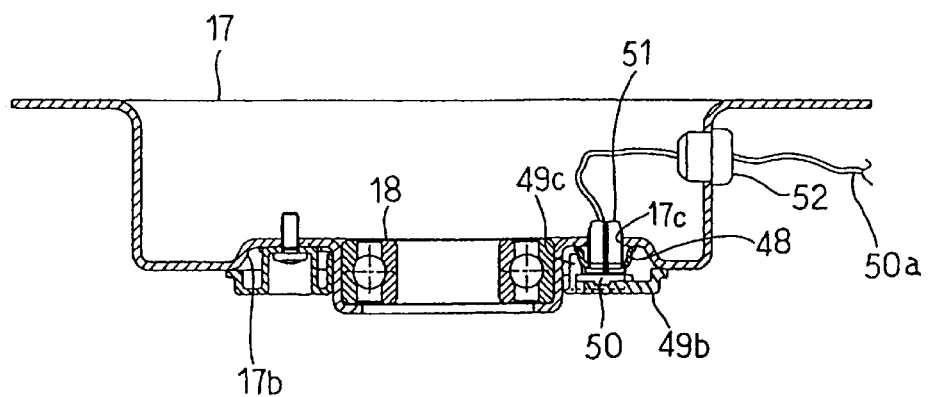
FIG. 10 is a sectional view taken along line 10—10 in FIG. 9.

The lower cup 17 has a generally arcuate recess 17b as shown in FIGS. 9 and 10. Two arcuate cushion holders 48 are screwed in the recess 17b. A substantially flat cover 49 is attached to the backside of the lower cup 17. The cover 49 includes two cushions 49a each made of urethane and located near the clutch engagement hole 17a, and a holder cover 49b made of a synthetic resin and covering the cushion holders 48 from below. The cushions 49a are fixed to distal ends of the cushion holders 48 respectively, and the holder cover 49b is screwed to the lower cup 17.

The holder cover 49b has a claw 49c formed integrally thereon. A switch serving as engagement detector in the invention or a reed switch 50 responsive to a magnetic flux is engaged with the claw 49c to thereby be held thereon. A rubber bush 51 is interposed between the lower cup 17 and one of the cushion holders 48. A grommet 52 is attached to the lower cup 17. A cable 50a for the reed switch 50 is drawn through the bush 51 and the grommet 52 outside the lower cup 17 and further connected via the control circuit board of the operation panel 24 to the control device 25.

Figure 2:
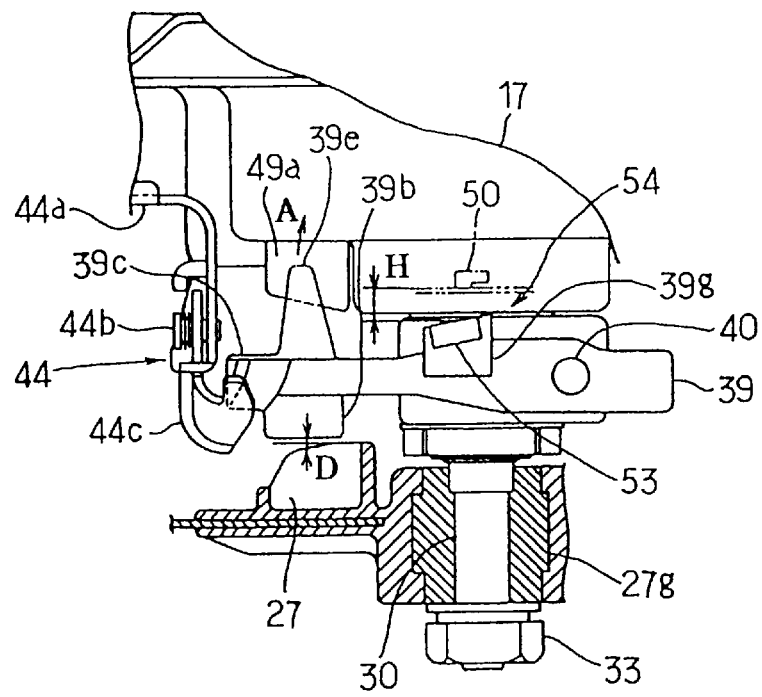
FIG. 2 is a view similar to FIG. 1, showing the condition in the dehydration step.

The clutch 39 has a generally U-shaped magnet mounting section 39g formed integrally therein as shown in FIGS. 6 and 7. A rectangular permanent magnet 53 constituting the engagement detector with the reed switch 50 is screwed in the magnet mounting section 39g. One end of the permanent magnet 53 protrudes out of the magnet mounting section 39g. The restricting claw 39e of the clutch 39 is in engagement with the clutch engagement hole 17a of the lower cup 17 as shown in FIG. 2. When a distance H between the reed switch 50 and the permanent magnet 53 becomes 3 mm or less, the reed switch 50 delivers an ON signal through the cable 50a and the control circuit board to the control device 25, as shown in FIG. 2.

The reed switch 50 is turned off when the clutch 39 is rotated in the direction opposite arrow A and the distance H between the reed switch 50 and the permanent magnet 53 reaches 7 mm, as shown in FIG. 2. In this condition, a gap D of 1.2 mm is defined between the engagement protrusion 27h of the rotor 27 and the connecting protrusion 39b of the clutch 39. The reed switch 50 is turned off before the connecting protrusion 39b engages the engagement protrusions 27i of the rotor 27. Reference numeral 54 designates the engagement detector comprising the reed switch 50 and the permanent magnet 53.

Each long side Ha of the permanent magnet 53 is set to have a larger length than one side Hb of the magnet mounting section 39g, so that the permanent magnet 53 is prevented from an erroneous assembly onto the magnet mounting section 39g in the state rotated about 90 degrees relative to the disposition in FIG. 6. The permanent magnet 53 is formed with a recess 53a in which a head 55a of a screw 55 for fixing the magnet to the mounting section is accommodated so that the screw head does not protrude from the upper face of the magnet.

A water supply valve 56 (see FIG. 14) is provided in the outer cabinet 11. A shaft packing 57 is attached to the upper cup 15 so as to be located over the rolling bearing 16 as shown in FIG. 3. The shaft packing 57 seals a gap between the upper cup 15 and the attachment 20, thereby preventing water leakage therebetween.

The operation of the washing machine will now be described. When the user operates one or more of the operation keys 24a of the operation panel 24 to thereby designate an automatic washing operation, the control device 25 proceeds to a wash step to drive the lever motor 47 and to close the drain valve. Furthermore, the control device 25 opens the water supply valve 56 so that water is supplied into the rotatable tub 21. Thereafter, the control device 25 supplies a driving power to the motor 28. In this initial state, as shown in FIG. 1, the restricting claw 39e of the clutch 39 engages the clutch engagement hole 17a of the lower cup 17, so that transmission of the rotating force is interrupted between the rotor 27 and the tub shaft 19 and the rotation of the tub shaft 19 is restricted. Accordingly, the rotating force of the rotor 27 is transmitted only to the agitator shaft 30, whereby the agitator 31 is rotated with the agitator shaft 30 so that a wash operation is executed (step S1 in FIG. 16).

Upon execution of the wash operation for a predetermined time, the control device 25 applies an electrical brake to the motor 28 so that the rotor 27 is stopped. The drain valve 14 is then opened so that wash liquid in the rotatable tub 21 is discharged through the holes 21e and 21d, the water flow passage 22, and the drain hole 13a (step S2). Furthermore, the lever motor 47 is driven to rotate the operation lever 44. Then, the inclined portion 44f of the operation lever 44 abuts the inclined face 39f of the clutch 39 so that the clutch is rotated in the direction opposite arrow A. As a result, the restricting claw 39e is released from the engagement with the clutch engagement hole 17a, and the connecting protrusion 39b of the clutch 39 engages the engagement protrusions 27h of the rotor 27.

The control device 25 then determines whether the wash liquid has been discharged from the rotatable tub 21. When determining that the wash liquid has been discharged, the control device 25 proceeds to a dehydration stage to thereby supply the driving power to the motor 28 so that the rotor 27 is rotated. The rotating force of the rotor 27 is transmitted via the agitator shaft 30 to the agitator 31 to rotate the latter. Furthermore, the rotating force of the rotor 27 is transmitted via the clutch 39 and the tub shaft 19 to the rotatable tub 21 so that the rotatable tub is rotated at a high speed together with the agitator 31. The dehydration operation is thus executed (step S3).

The rotatable tub 21 has a number of dehydration holes (not shown) formed in an upper portion thereof. The wash liquid extracted from the laundry by the high speed rotation of the rotatable tub 21 is caused to rise up along the inner circumference of the outer cylinder 21a, being discharged through the dehydration holes outside the outer cylinder. The water-receiving tub 13 has an auxiliary drain hole 13b formed in the bottom thereof so as to communicate with the drain hole 13a. The wash liquid discharged out of the outer cylinder 21a is discharged through the auxiliary drain hole 13b and the drain hole 13a in turn.

Upon execution of the dehydration operation for a predetermined time, the control device 25 proceeds from step 3 to step S4 to apply an electrical brake to the motor 28 so that the rotor 27, the tub shaft 19 and the agitator shaft 30 are stopped. The control device 25 then proceeds from step S4 to step S5 to energize the lever motor 47 so that the operation plate 44c of the operation lever 44 is advanced inside the rotational locus of the protrusion 39c of the clutch 39. Thereafter, the control device 25 proceeds from step S5 to step S6 to supply the driving power to the motor 28 so that the rotor 27 is rotated one turn at a speed lower than that in the dehydration operation. The clutch 39 is then rotated with the rotatable tub 21 so that the inclined face 39d thereof abuts the inclined portion 44e of the operation plate 44. As a result, the clutch 39 is rotated in the direction of arrow A. In this case, the restricting claw 39e of the clutch 39 is vertically opposed to the clutch engagement hole 17a of the base 17 when the inclined face 39d is in abutment with the inclined portion 44e of the operation plate 44c. Accordingly, the restricting claw 39e enters and engages the clutch engagement hole 17a upon rotation of the clutch 39 in the direction of arrow A. With the rotation of the clutch 39, the control device 25 proceeds from step S6 to step S7 to determine whether the reed switch 50 is turned on. When the restricting claw 39e is in engagement with the clutch engagement hole 17a, the permanent magnet 53 is close to the reed switch 50, whereupon the reed switch is turned on. In this case, the control device 25 determines in the affirmative (YES at step S7). The control device 25 then proceeds to a next step to supply water into the rotatable tub 21 and rotate the rotor 27 for rotation of the agitator 31. Thus, a rinse operation is executed.

On the other hand, when the claw 39e is out of engagement with the clutch engagement hole 17a but in abutment with the backside of the cushion 49a or the holder cover 49b, the connecting protrusion 39b of the clutch 39 is in engagement with the engagement protrusions 27h of the rotor 27. In this case, since the permanent magnet 53 is away from the reed switch 50, the latter is turned off. The control device 25 then determines in the negative (NO at step S7), proceeding to step S8 to determine whether the rotor 27 has been rotated three turns. Since the rotor 27 has been rotated only one turn, the control device 25 determines in the negative (NO at step S8). Upon the negative determination at step S8, the control device 25 repeats step S6 in which the rotor 27 is re-rotated at the low speed one turn, step S7 for the determination as to whether the reed switch 50 is turned on, and step S8 for the determination as to whether the rotor 27 has been rotated three turns, sequentially.

The reed switch 50 is turned on when the inclined face 39d of the clutch 39 abuts the inclined portion 44e of the operation plate 44c so that the clutch 39 is rotated in the direction of arrow A and the restricting claw 39e engages the clutch engagement hole 17a of the lower cup 17. The control device 25 then determines in the affirmative (YES at step S7), proceeding to the step for execution of the rinse operation.

Furthermore, when the rotor 27 is rotated three turns and the claw 39e does not engage the clutch engagement hole 17a such that the reed switch 50 is not turned on, the control device 25 proceeds from step S8 to step S9 to display an error message "E81" on the display 24b of the operation panel 24 to thereby inform that the clutch 39 has not been switched normally.

According to the above-described embodiment, the lower cup 17 is substantially flat except for the clutch engagement hole 17a. Accordingly, the restricting claw 39e of the clutch 39 is prevented from being caught by the flat portion of the lower cup 17. This can prevent the claw 39e from engaging the portion of the lower cup 17 other than the hole 17a when the clutch 39 is switched to the wash operation (in the direction of arrow A) or when the washing machine is conveyed. Furthermore, the clutch 39 can be switched normally since the operation plate 44c of the operation lever 44 is advanced into the rotational locus of the protrusion 39c of the clutch 39 so that the clutch is re-switched.

The substantially flat holder cover 49b is attached to the lower cup 17, and the lower cup 17 is substantially flat except for the clutch engagement hole 17a as described above. Accordingly, since the cushion holders 48 are attached to the lower cup 17, the underside of the lower cup can be rendered rugged, whereupon the degree of freedom in the design of the washing machine can be improved.

The engagement detector 54 is provided for detecting the engagement of the clutch 39 with the engagement hole 17a of the lower cup 17. Accordingly, countermeasures, for example, re-execution of engagement of the clutch 39, can be taken when the engagement cannot be detected by the engagement detector 54. Consequently, the clutch 39 can further be switched normally. Moreover, the above-mentioned countermeasures are taken only when the engagement of the clutch 39 is not detected. Consequently, a clutch switching time can be shortened in the foregoing embodiment as compared with the case where the countermeasures are taken every time the clutch is rotated in the direction of arrow A.

The reed switch 50 is turned on when the clutch 39 has engaged the engagement hole 17a of the lower cup 17. The reed switch 50 is turned off when the clutch 39 is incompletely engaged. Accordingly, when the reed switch 50 is disconnected or otherwise broken with the clutch 39 being incompletely engaged, the control device 25 determines, on the basis of the OFF-state of the reed switch 50, that the clutch 39 has not engaged the engagement hole 17a, whereupon the rotor 27 is maintained in the stopped state. Consequently, breakage of the washing machine due to the starting of the rotor 27 in the incompletely engaged state of the clutch can reliably be prevented. In this case, when the control device determines whether the reed switch 50 is turned on, in the starting of the operation of the washing machine, it can take countermeasures such as informing the abnormal condition of the reed switch 50 to thereby prompt replacement of the reed switch.

Furthermore, the reed switch 50 is turned off before the clutch 39 is rotated to engage the rotor 27. Accordingly, the reed switch 50 is turned off when the clutch is incompletely engaged in the switching from the dehydration operation to the wash operation (in the direction opposite arrow A). Accordingly, the reed switch 50 is turned off, for example, when the clutch 39 incompletely engage both the engagement hole 17a and the rotor engagement protrusions 27h simultaneously. In this case, too, the control device 25 can be prevented from determining that the clutch 39 has switched to the wash operation and accordingly, the breakage of the washing machine due to the starting of the rotor 27 can be prevented.

The permanent magnet 53 is attached to the clutch 39. The reed switch 50 is mounted on the holder cover 49b disposed at the lower cup side. Consequently, the wiring of the cable 50a of the reed switch 50 can be rendered easier as compared with the case where the reed switch is mounted on the clutch 39 at the moving side and the permanent magnet is mounted on the lower cup at the fixed side. Furthermore, since the reed switch 50 is fixed by the claw 49c of the holder cover 49b, the number of parts can be reduced as compared with the case where the reed switch is screwed, and the work for screwing the reed switch can be eliminated.

When the engagement of the clutch 39 with the lower cup 17 is not detected, the operation plate 44c is advanced into the rotational locus of the protrusion 39c of the clutch 39, and the rotor 27 is rotated at a plurality number of turns. Consequently, even when the clutch is not engaged with the lower cup during the first rotation of the rotor, it can be engaged with the lower cup during one of the subsequent times of rotation of the rotor.

The cushions 49a are attached to the lower cup 17 near the clutch engagement hole 17a. Accordingly, since an impact force due to collision of the claw 39e etc. against the lower cup 17 is absorbed by the cushions 49a, an offensive sound due to the collision can be prevented. Furthermore, since a mechanical fatigue of the clutch 39 due to repeated collision of the claw 39e against the lower cup 17 is reduced, the service life of the clutch can be improved.

In the foregoing embodiment, the rotor 27 is rotated three turns with the operation plate 44c being maintained inside the rotational locus of the clutch 39 when the engagement of the clutch with the lower cup 17 is not detected. However, the rotor 27 may be rotated two, four or more turns, instead. Furthermore, the rotor 27 may be rotated at a plurality of number of times with the operation plate 44c being maintained inside the rotational locus of the clutch every time the clutch is switched to the wash operation. In this case, the reed switch 50 and the permanent magnet 53 may be eliminated.

Although the underside of the cover 49 is completely flat in the foregoing embodiment, the underside may be rugged in such a degree that the restricting claw 39e cannot engage it. Thus, the underside of the cover 49 may be substantially flat.

FIG. 17 illustrates a second embodiment of the invention. The similar or identical parts in the second embodiment are labeled by the same reference symbols as in the first embodiment. Differences between the first and second embodiments will be described.

The control device 25 supplies the driving power to the lever motor 47 at step S5 so that the operation plate 44c of the operation lever 44 is caused to enter the rotational locus of the protrusion 39c of the clutch 39. Then, the control device 25 proceeds to step S6 where the rotor 27 is rotated at lower speed one turn so that the clutch 39 is rotated in the direction of arrow A. Upon rotation of the clutch 39 in the direction of arrow A, the control device 25 proceeds to step S7 to determine whether the reed switch 50 has been turned on. When the claw 39e is in engagement with the engagement hole 17a and the reed switch 50 is turned on, the control device 25 determines in the affirmative at step S7, executing the rinse operation.

On the other hand, when the claw 39e is not in engagement with the engagement hole 17a and the reed switch 50 is turned off, the control device 25 determines in the negative (NO at step S7), proceeding to step S10. The control device 25 deenergizes the lever motor 47 and withdraws the operation plate 44c outside the rotational locus of the protrusion 39c of the clutch 39. The control device 25 then proceeds from step S10 to step S8, thereby determining whether the rotor 27 has been rotated three turns. Since the rotor has been rotated only one turn, the control device 25 determines in the negative (NO at step S8).

Upon the negative determination at step S8, the control device 25 repeats step S5 in which the operation plate 44c is caused to enter the rotational locus of the clutch 39, step S6 in which the rotor 27 is rotated one turn at the lower speed, step S7 for the determination as to whether the reed switch 50 has been turned on, step S10 in which the operation plate 44c is withdrawn outside the rotational locus of the clutch 39, and step S8 for the determination as to whether the rotor 27 has been rotated three turns, sequentially.

The control device 25 determines in the affirmative (YES at step S7) to thereby execute the rinse operation when the claw 39e of the clutch 39 is in engagement with the engagement hole 17a of the lower cup 17 and the reed switch 50 is turned on. Furthermore, the control device 25 proceeds from step S8 to step S9 to display the error message "E81" on the display 24b when the claw 39e does not engage the engagement hole 17a even if the rotor 27 is rotated three turns.

According to the second embodiment, the operation plate 44c is caused to enter the rotational locus of the clutch 39 so that the rotor 27 is rotated one turn at a plurality of times when the clutch 39 does not engage the engagement hole 17a of the lower cup 17 during the first operation. Consequently, the clutch 39 can finally engage the lower cup 17 even if it does not engage the lower cup during the first operation. Furthermore, when the claw 39e of the clutch 39 is insufficiently advanced into the engagement hole 17a such that the engagement is incomplete, the inclined portion 44f of the operation lever 44 abuts the inclined face 39f of the clutch 39 when the operation lever 44 is rotated at step S5. Accordingly, since the clutch 39 is rotated in the direction opposite arrow A, the claw 39e is released from the incomplete engagement with the engagement hole 17a. When the rotor 27 starts under the conditions that the claw 39e is in an incomplete engagement with the engagement hole 17a and the connecting protrusion 39b is incompletely released from the engagement with the engagement protrusions 27h of the rotor 27, the engagement protrusions 27h would be subjected to an excessive force to be broken. In the second embodiment, however, the above-described drawback can be prevented.

In the second embodiment, the operation lever 44 is rotated so that the rotor 27 is rotated one turn at a plurality of times when the engagement of the clutch with the lower cup 17 is not detected. However, the operation lever 44 may be rotated so that the rotor 27 is rotated one turn at a plurality of times every time the clutch 39 is switched to the wash operation, instead. In this case, the reed switch 50, the permanent magnet 53, etc. may be eliminated.

In the second embodiment, the operation lever 44 is rotated so that the rotor 27 is rotated one turn three times when the engagement of the clutch with the lower cup is not detected. However, the operation lever 44 may be rotated so that the rotor 27 is rotated one turn twice, four or more times, instead.

Figure 19:
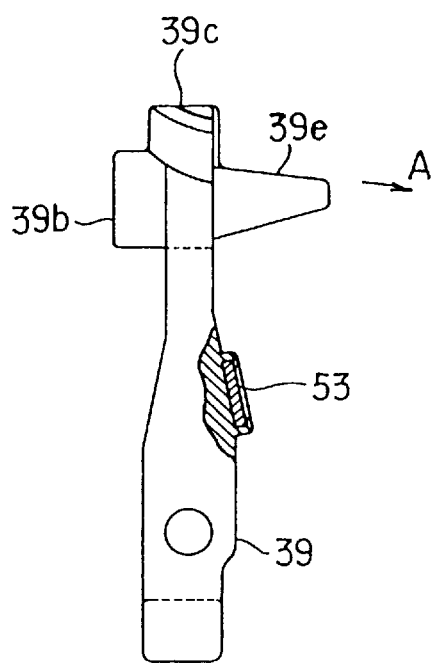
FIG. 19 is a view similar to FIG. 7, showing the clutch in the third embodiment.
Figure 18:
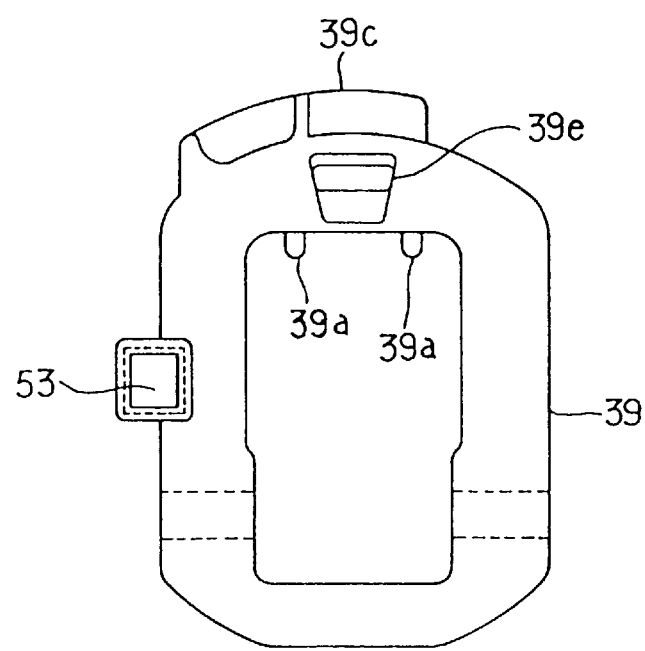
FIG. 18 is a view similar to FIG. 6, showing the clutch employed in the washing machine of a third embodiment.

The permanent magnet 53 is screwed to the clutch 39 in the first and second embodiments. However, the clutch 39 may be formed with a forming die section as shown as a third embodiment in FIGS. 18 and 19. The permanent magnet 53 may be accommodated in the forming die section of the clutch and the molten aluminum may be poured into the forming die section so that the permanent magnet 53 is formed integrally with the clutch 39. In this case, the screw 55 used to fix the permanent magnet 53 to the clutch 39 is eliminated. Since the permanent magnet need not be screwed, the construction of the drive switching mechanism can be simplified and the manufacturing efficiency can be improved. Furthermore, the reed switch 50 is fixed to the holder cover 49b in the foregoing embodiments. However, the reed switch 50 may be screwed to the lower cup 17, instead.

Figure 20:
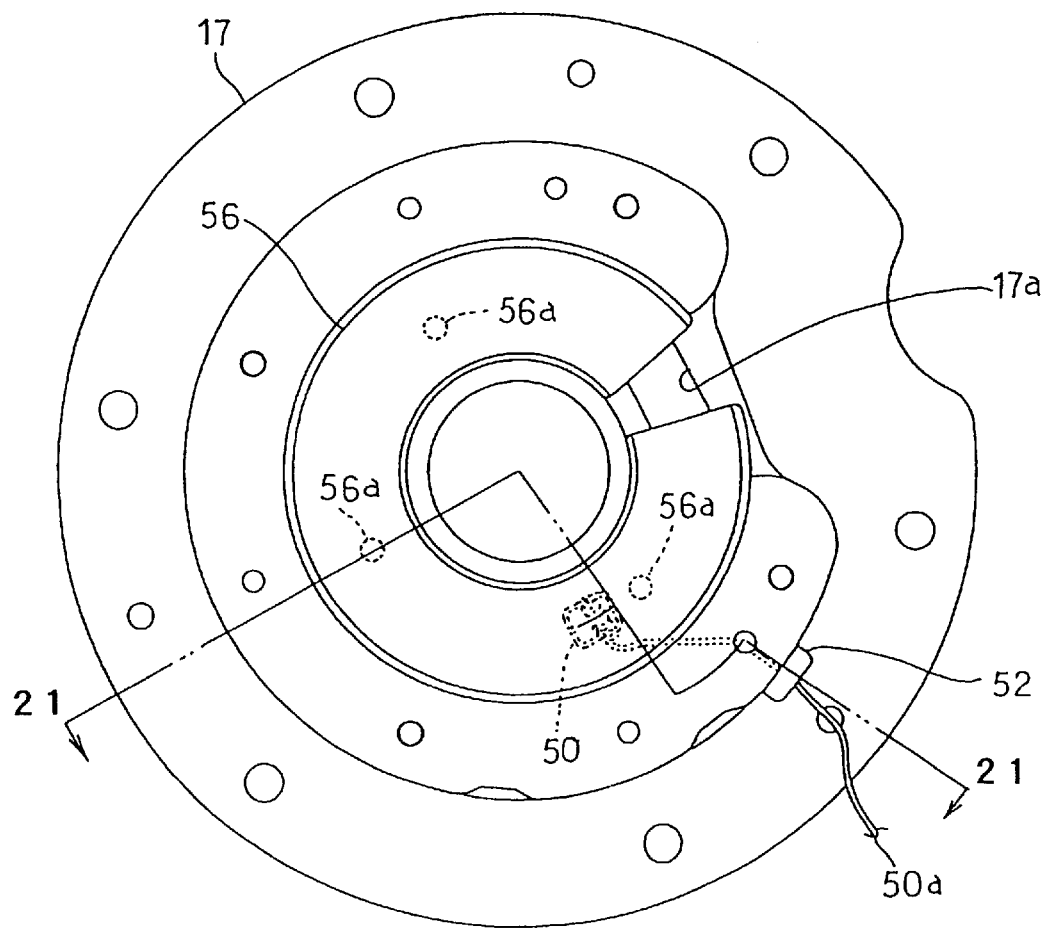
FIG. 20 is a view similar to FIG. 9, showing the lower cup in the washing machine of a fourth embodiment.
Figure 21:
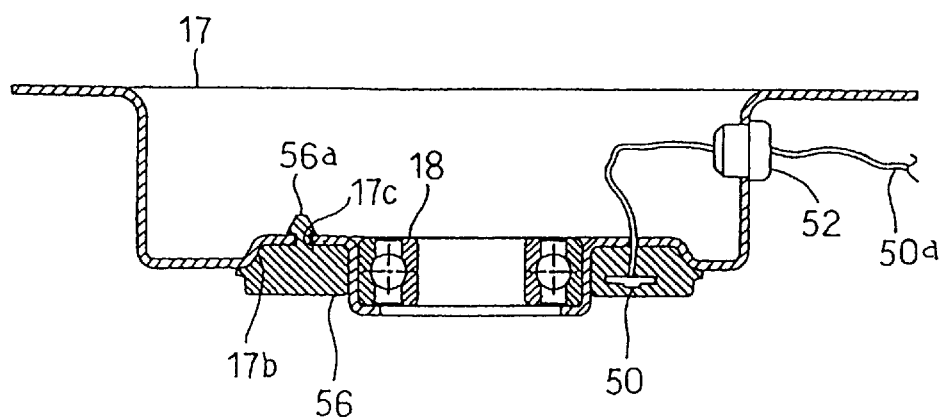
FIG. 21 is a sectional view taken along line 21—21 in FIG. 20.

The two cushions 49a and the holder cover 49a are attached to the lower cup 17 in the foregoing embodiments. A fourth embodiment as shown in FIGS. 20 and 21 provides an alternative construction. A cover 56 is made from a soft resin such as an elastomer (cushioning material). The cover 56 has a flat underside and is formed into an annular shape. The reed switch 50 is embedded in the cover 56. The cover 56 has a plurality of push-in protrusions 56a formed integrally on an upper face thereof. The push-in protrusions 56a are pushed into the cover engagement holes 17c of the lower cup 17 so that the cover 56 is fixed in the recess 17b of the lower cup 17.

According to the fourth embodiment, the two cushions 49a and the holder cover 49b are not required. Furthermore, since the reed switch 50 is embedded in the cover 56, the screw 55 used to fix the reed switch 50 is not required.

The restricting claw 39e of the clutch 39 is engaged with the clutch engagement hole 17a of the lower cup 17 in the foregoing embodiments. However, the clutch 39 may be formed with a restricting hole and the lower cup 17 may be formed with a clutch engagement protrusion so that the restricting hole of the clutch 39 is engaged with the clutch engagement protrusion of the lower cup 17, instead.

The restricting claw 39e abuts the cushion 49a and the holder cover 49b and the connecting protrusion 39b engages the rotor 27 when the claw 39e is not in engagement with the clutch engagement hole 17a of the lower cup 17. However, the clutch 39 may be rotated in the direction opposite arrow A by the spring force of the toggle spring 41 so that the claw 39e is departed from the cushion 49a and the holder cover 49b and so that the connecting protrusion 39b engages the rotor 27.

The switch constituting the engagement detecting means is turned on when the claw 39e completely engages the engagement hole 17a of the clutch 17 in the foregoing embodiments. However, the switch may be turned off, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A washing machine comprising:
a base supporting the washing machine;
a tub shaft rotatably mounted on the base;
a rotatable tub connected to the tub shaft;
an agitator provided in the rotatable tub;
a motor for driving the agitator;
a drive switching mechanism for selectively forming (i) a first connected state connecting the rotatable tub to the base, thereby restricting rotation of the rotatable tub, or (ii) a second connected state connecting the rotatable tub to a rotation system of the motor to thereby rotate the rotatable tub, the drive switching mechanism comprising:
a first engagement portion provided on a side of the base;
a second engagement portion provided on a side of the rotation system;
a clutch attached to the tub shaft to be rotatable about a fulcrum thereof; and
an operation member provided at the base side for selectively engaging the clutch with the first or second engagement portion, the operation member being advanced into and retreated out of a rotational locus of the clutch rotated with the tub shaft, the operation member abutting the clutch at an advanced location to thereby rotate the clutch so that the clutch is engaged alternately and selectively with the first and second engagement portions;

wherein the first connected state is formed when the operation member engages the clutch with the first engagement portion;

wherein the second connected state is formed when the operation member engages the clutch with the second engagement portion;

wherein the base includes a region through which the clutch passes, the region including a separate portion; and a cover attached to the base for covering the separate portion, the cover having a substantially flat side corresponding to the region of the base.

2. A washing machine comprising:

a rotatable tub for providing rotation;

an agitator provided in the rotatable tub;

a motor driving the agitator;

a drive switching mechanism for selectively forming (i) a first connected state connecting the rotatable tub to a stationary member, the stationary member being non-rotatable relative to the rotatable tub thereby restricting rotation of the rotatable tub, or (ii) a second connected state connecting the rotatable tub to a rotation system of the motor to thereby rotate the rotatable tub, the drive switching mechanism comprising:

a first engagement portion disposed at a side of the stationary member;

a second engagement portion disposed at a side of the rotation system of the motor;

a clutch movably provided at a side of a rotation system of the rotatable tub; and an operation member operated to selectively engage the clutch with the first or second engagement portion, the first connected state being formed when the clutch is engaged with the first engagement portion and the second connected state being formed when the clutch is engaged with the second engagement portion;

wherein the clutch is adapted to be rotated relative to the first engagement portion upon rotation of the rotatable tub to thereby engage the first engagement portion only at a predetermined rotational position thereof; and an engagement detector for detecting accomplishment or non-accomplishment of engagement between the first engagement portion and the clutch.

3. A washing machine comprising:

a base supporting the washing machine;

a tub shaft rotatable mounted on the base;

a rotatable tub connected to the tub shaft;

a motor for driving the agitator;

a drive switching mechanism for selectively forming (i) a first connected state connecting the rotatable tub to the base thereby restricting rotation of the rotatable tub, or (ii) a second connected state connecting the rotatable tub to a rotation system of the motor to thereby rotate the rotatable tub, the drive switching mechanism comprising:

a first engagement portion provided on a side of the base;

a second engagement portion provided on a side of the rotation system of the motor;

a clutch attached to the tub shaft to be rotatable about a fulcrum thereof; and an operation member provided at the base side for selectively engaging the clutch with the first or second engagement portion, the operation member being advanced into and retreated out of a rotational locus of the clutch rotated with the tub shaft, the operation member abutting the clutch at an advanced location to thereby rotate the clutch so that the clutch is engaged alternately and selectively with the first and second engagement portions; and an engagement detector including a switch turned on or off when the clutch engages the first engagement portion.

4. A washing machine according to claim 3, wherein an ON or OFF state of the switch is reversed prior to engagement of the clutch with the second engagement portion when the clutch is moved from the first engagement portion to the second engagement portion.

5. A washing machine according to claim 4, wherein the engagement detecting means comprises a permanent magnet attached to the clutch and a reed switch attached to the base side for detecting a magnetic flux from the permanent magnet.

6. A washing machine according to claim 5, wherein the permanent magnet is formed integrally on the clutch.

7. A washing machine according to claim 3, wherein the engagement detecting means comprises a permanent magnet attached to the clutch and a reed switch attached to the base side for detecting a magnetic flux from the permanent magnet.

8. A washing machine according to claim 7, wherein the permanent magnet is formed integrally on the clutch.

9. A washing machine according to claim 3, further comprising an electric control device rotating a rotor of the motor at a number of a plurality of turns with the operation member remaining inside the rotational locus of the clutch when the engagement of the clutch with the first engagement portion is not detected.

10. A washing machine according to claim 3, further comprising an electric control device executing at a plurality of times an operation in which a rotor of the motor is rotated one turn with the operation member being advanced inside the rotational locus of the clutch when the engagement of the clutch with the first engagement portion is not detected.

11. A method of controlling a washing machine which includes:

a rotatable tub provided for rotation;

an agitator provided in the rotatable tub;

a motor for driving the agitator; and a drive switching mechanism for selectively forming a first connected state in which the rotatable tub is connected to a stationary member non-rotatable relative to the rotatable tub so that rotation of the rotatable tub is restricted, or a second connected state in which the rotatable tub is connected to a rotation system of the motor to thereby be rotated, the drive switching mechanism comprising:

a first engagement portion disposed at the stationary member side;

a second engagement portion disposed at a side of a member constituting the rotation system of the motor;

a movable engagement member movably provided at a side of a member constituting a rotation system of the rotatable tub; and an operation member operated to selectively engage the movable engagement member with the first or second engagement portion;

wherein the first connected state is formed when the movable engagement member is engaged with the first engagement portion by the operation member;

wherein the second connected state is formed when the movable engagement member is engaged with the second engagement portion by the operation member; and wherein the movable engagement member is adapted to be rotated relative to the first engagement portion upon rotation of the rotatable tub to thereby engage the first engagement portion only at a predetermined rotational position thereof;

an engagement detector for detecting engagement of the movable engagement member with the first engagement portion or disengagement of the movable engagement member from the first engagement portion; and said method comprising switching a washing operation to a condition where the engagement detector has detected the engagement of the movable engagement member with the first engagement portion.

12. A method of controlling a washing machine which includes:

a rotatable tub provided for rotation;

an agitator provided in the rotatable tub;

a motor for driving the agitator; and a drive switching mechanism which selectively forms a first connected state in which the rotatable tub is connected to a stationary member non-rotatable relative to the rotatable tub so that rotation of the rotatable tub is restricted, or a second connected state in which the rotatable tub is connected to a rotation system of the motor to thereby be rotated, the drive switching mechanism comprising:

a first engagement portion disposed at the stationary member side;

a second engagement portion disposed at a side of a member constituting the rotation system of the motor;

a movable engagement member movably provided at a side of a member constituting a rotation system of the rotatable tub; and an operation member operated to selectively engage the movable engagement member with the first or second engagement portion;

wherein the first connected state is formed when the movable engagement member is engaged with the first engagement portion by the operation member;

wherein the second connected state is formed when the movable engagement member is engaged with the second engagement portion by the operation member; and wherein the movable engagement member is adapted to be rotated relative to the first engagement portion upon rotation of the rotatable tub to thereby engage the first engagement portion only at a predetermined rotational position thereof;

an engagement detector which detects engagement of the movable engagement member with the first engagement portion or disengagement of the movable engagement member from the first engagement portion, thereby delivering a signal; and said method comprising:

rotating the rotatable tub at a speed lower than in a dehydration operation at a predetermined number of times;

determining, on the basis of the signal delivered from the engagement detector, whether the movable engagement member has engaged the first engagement portion during rotation of the rotatable tub at the lower speed;

re-executing the rotation of the rotatable tub at the lower speed when the movable engagement member has been determined not to have engaged the first engagement portion, and re-determining whether the movable engagement has engaged the first engagement portion during re-rotation of the rotatable tub at the lower speed; and switching a washing operation to another operation when engagement of the movable engagement member with the first engagement portion has been determined to have been accomplished at the re-determining.

13. A washing machine according to claim 3, wherein the stationary member constitutes a base supporting the rotatable tub, and the first engagement portion is formed on the base and the base includes a region through which the movable engagement member passes, the region further including a part other than the first engagement portion formed substantially into a flat face in a direction of rotation of the movable engagement member.

* * * * *